INVENTOR
John Opie
BY John F Brezina
ATTORNEY 3,040,654
MACHINES FOR COMPRESSING MEAT
John Opie, 64 S. Herbert Road, Riverside, Ill.
Filed Nov. 3, 1959, Ser. No. 850,551
8 Claims. (Cl. 100—53)

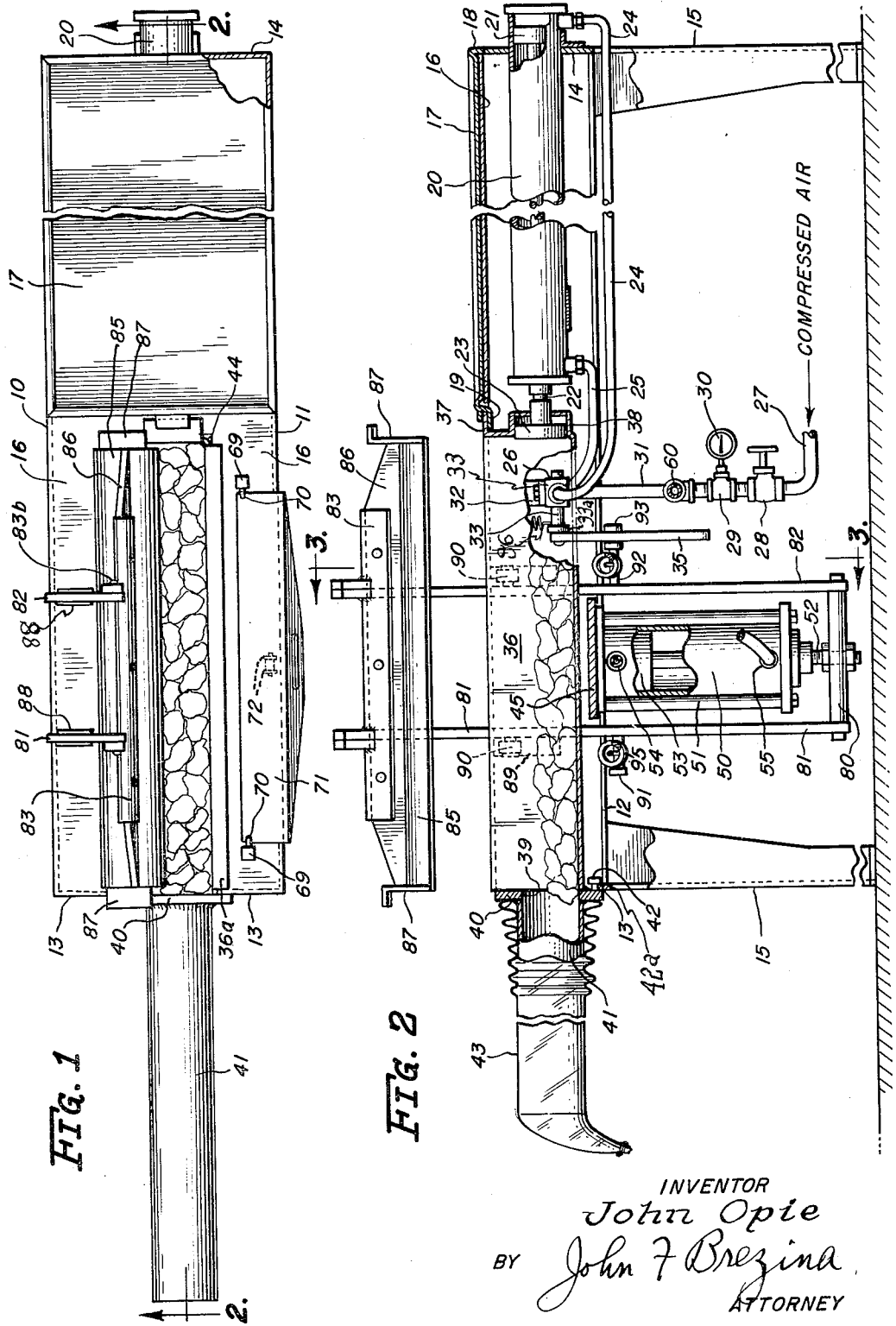

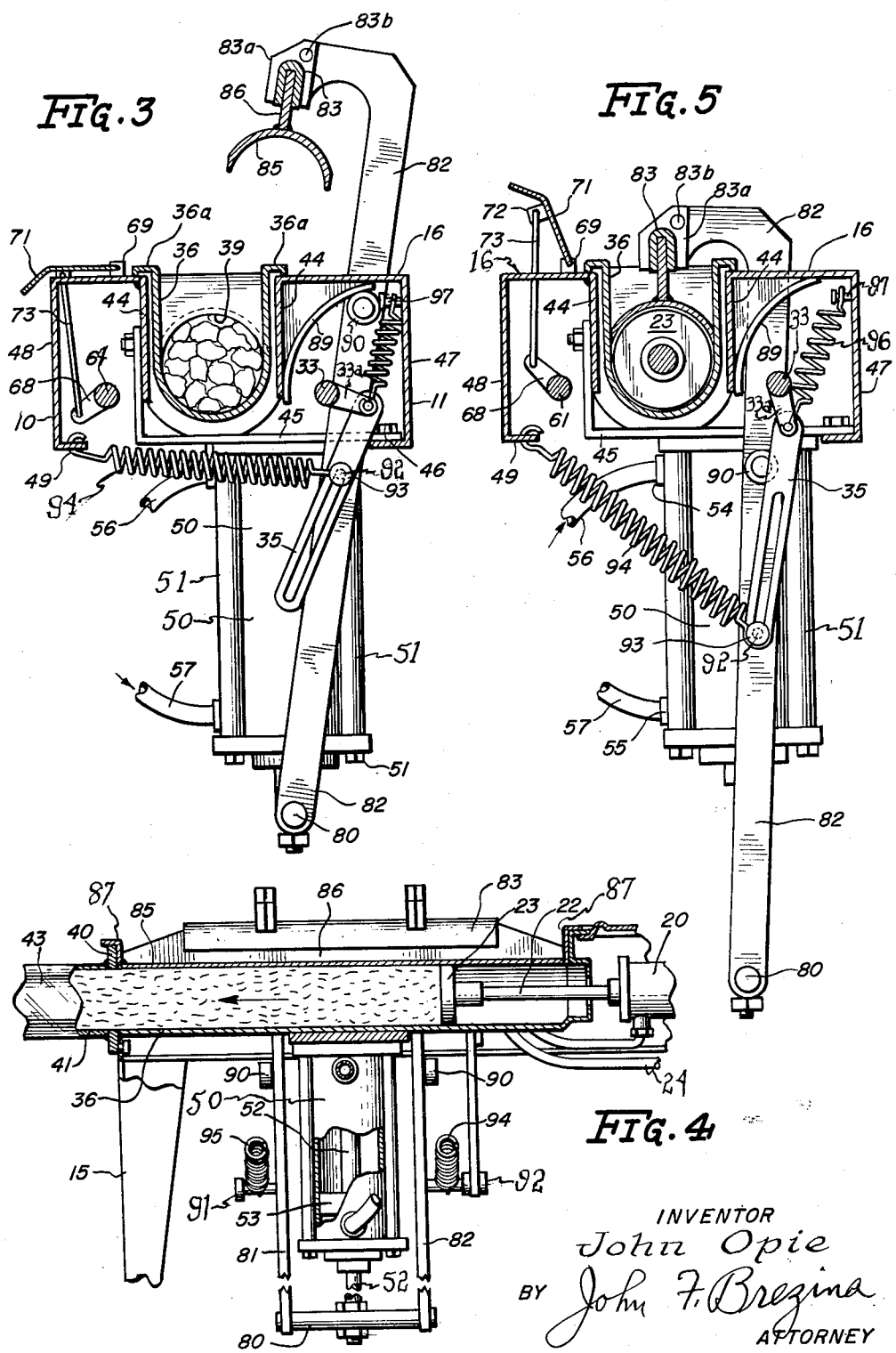

This invention is directed to novel improvements in machines for compressing meat or pieces and particles of meat into elongated predetermined shapes and for pressing and ejecting the formed masses into either casings, cans or other containers.

It is an important object of my invention to provide an automatic machine for pressing together masses of finely divided meat or of meat pieces into desired elongated shapes and forms to provide for their insertion and positioning in containers or casings, and which machines include an elongated removable meat receiving receptacle, mold, trough or hopper, a movably mounted pressure plate; a novel air-actuated or fluid actuated mechanism for lowering and for raising selectively said pressure plate with respect to said receptacle or trough; and novel air-operated mechanism for pushing out the compressed meat through a restricted outlet member and into suitable receptacles, packages and casings; and manually operable means for selectively actuating the aforesaid mechanism.

A further object and accomplishment of my invention is the provision of a compression receptacle or hopper or mold having an upper opening and adapted to receive meat or the like, and an air-operated or fluid operated piston and compression plate adapted to compress the meat into desired form, and manually controlled air-operated mechanism for selectively pressing and discharging the compressed meat from the machine.

A further object of my invention is the provision of a machine having the novel features recited in the two foregoing paragraphs and in which the compression plate is removably mounted relative to said meat receptacle and which has novel lever mechanism for selectively elevating said compression plate and moving it transversely into positions where it will not obstruct the upper opening of the compression receptacle to thereby facilitate easy reloading of said compression receptacle, and which includes an air-operated piston slidable in the cylinder for selectively raising and lowering said compression plate and moving it transversely and which further includes a second air-operated piston and plunger with respect to an air cylinder for pushing the compressed meat mass through a restricted outlet.

Other and important objects of my invention will be apparent from the annexed specification and claims.

On the drawings:

FIG. 1 is a top plan view of my novel meat pressing and packaging machine.

FIG. 2 is a cross sectional view on a vertical plane indicated by line 2—2 of FIG. 1.

FIG. 3 is an enlarged partially cross sectional view taken on line 3—3 of FIG. 2 and showing certain parts in elevation.

FIG. 4 is a cross sectional view taken on a vertical longitudinal plane and showing the air-operated mechanism, with parts broken away, for operating the compression mechanism.

FIG. 5 is a cross sectional view taken on a vertical plane transversely of the machine and showing the compression means in lowered position.

Figure 6:
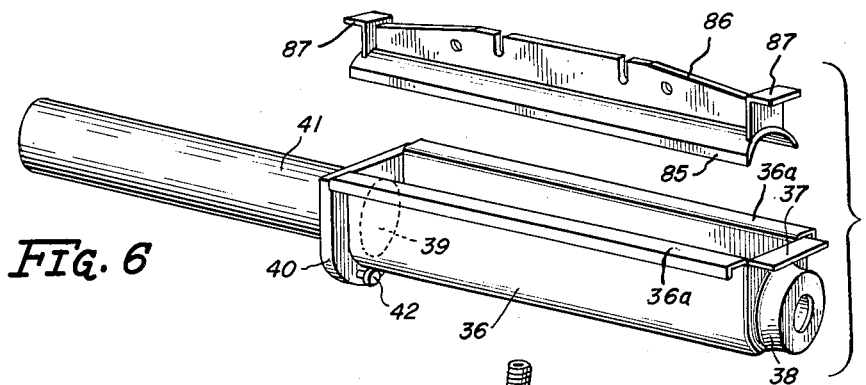
FIG. 6 is an enlarged perspective view of the meat receptacle and nozzle and showing the pressure member separated and above the receptacle.

Referring to FIGS. 1 and 2, numerals 10 and 11 designate two elongated flanged metal side bars which are connected by a transversely extending horizontal plate 12 and also connected at their ends by transversely extending walls 13 and 14. Aforesaid bars and plates are suitably connected at their junctures to form a substantially rectangular frame which is normally supported by four legs 15, two of which are illustrated in FIG. 2. A transversely extending top wall 16 extending from the rear end of the machine toward its middle portion also connects the side bars 10 and 11. Removably mounted on the top plate 16 is a flanged metal panel 17 which has its rear edge portion 18 and its forward edge portion bent angularly to form a flange 19 as illustrated in FIG. 2. Mounted in the chamber of the rear of the machine below the top wall or top plate 16 is a horizontal air cylinder 20 in which a slidable mounted piston 21 having piston rod 22 thereon. The forward end of said piston rod 22 has a plunger 23 secured thereon. The rear end of the cylinder 20 has a threaded nipple thereon and which is secured to one end of an air pipe 24 as shown in FIG. 2. The forward end of the cylinder 20 has a nipple thereon and which is secured an air pipe 25. Said air pipes are connected to a four-way air control valve 26 shown in cross-section at the right of FIG. 8, said pipe 25 being connected to the right hand nipple of the housing of air valve 26 and air pipe 24 being connected to the left hand nipple of the air valve 26.

Figure 8:
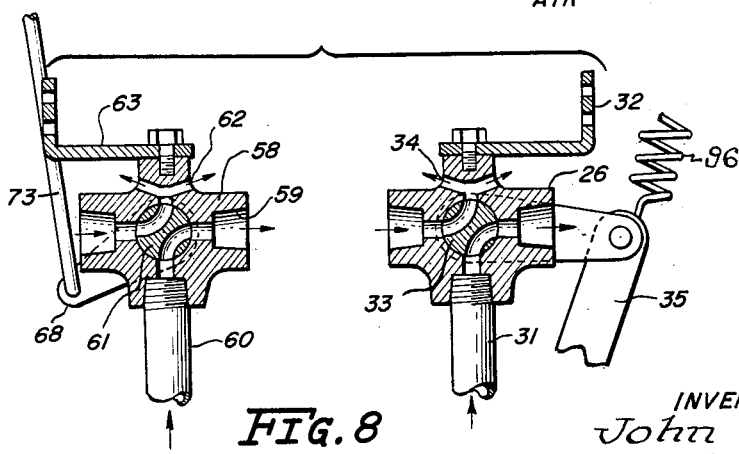
FIG. 8 is a cross sectional view of said air control valves and taken on a line indicated by line 8—8 of FIG. 7.

Referring to FIG. 2, numeral 27 is an air pipe connected to its compressed air source and to the valve 28 and to the T 29 as shown in FIG. 2. Numeral 30 designates an air pressure gauge of conventional construction mounted in T 29. T 29 is connected by a pipe 31 to the lower nipple of the air control valve 26. The air control valve 26 is held and secured to an annular metal bracket 32 which has one end secured to one of the side bars 10. Air control valve 26 has a rotatable valve element 33 journalled therein and which has two separate passages therethrough as illustrated at the right of FIG. 8. Said valve 26 also has an exhaust port 34 therein as shown at the right of FIG. 8.

Valve element 33 has a projecting shaft portion as illustrated in FIG. 2 and which has a reduced end to which reduced end portion is secured an arm 33a. One end of a slotted lever 35, is pivoted by a pin to arm 33a, the operation of which lever will be described hereinafter.

Removably mounted in the forward portion of the supporting stand or table is an elongated passaged metal hopper, mold or receptacle 36. Said receptacle or mold or hopper 36 opens upwardly and has upper peripheral horizontal extending flanges 37 which normally rest on horizontal plate of the stand.

The forward end wall 40 of said receptacle or mold 36, as shown in FIG. 6, is secured permanently to the hopper, for example, by welding. The inner end of the spout or nozzle 41 is welded to the end wall 40, surrounding the outlet opening and its lower wall portion is in alignment with the bottom portion of the hopper or mold 36. Accordingly, said hopper 36 and said spout 41 are connected and rigid relative to each other. It will be noted that the end wall 40 has its edge or flange portions projecting outwardly as illustrated in FIG. 6, and a rigid pin 42 is mounted in the lower portion of said flange of the end wall 40, which said pin provides for engagement of a suitable hook 42a pivoted on the machine and illustrated in cross section in FIG. 2. The engagement of said hook 42a with pin 42 releasably anchors said hopper in position.

Numeral 39, shown in FIG. 6, designates the outlet opening in end wall 40 which leads from said hopper 36 to spout 41.

The rear end wall of the hopper or mold 36 is provided with an integral annular flange 38 which defines a round hole through which the piston rod 22 of the reciprocal plunger slides.

The spout or nozzle 41 is adapted to have either flexible casings or cans or receptacles mounted thereover. In FIG. 2 a tubular flexible casing 43 is illustrated as partially slipped and folded over a broken off segment of the nozzle 41.

It will be noted that the hopper or mold 36 has two longitudinal U-shaped flanges 36a integral with its side wall portions, as indicated in FIGS. 3 and 5, and which removable seat upon the upper faces of the horizontal portions of the angular plates 47, 48. Two depending mounting bars 44 form continuations of the horizontal portions 16.

As shown in FIGS. 3 and 5, a right-angled bracket 45 has one end secured by a bolt to one of said mounting bars 44 and its other end secured by a bolt 46 to lower flange portion of the side wall 47. As shown at the left of FIGS. 3 and 5, a U-shaped wall 48 has its upper edge secured by welding to the upper edge of the mounting bar 44, and its lower portion has an apertured flange 49.

Figure 7:
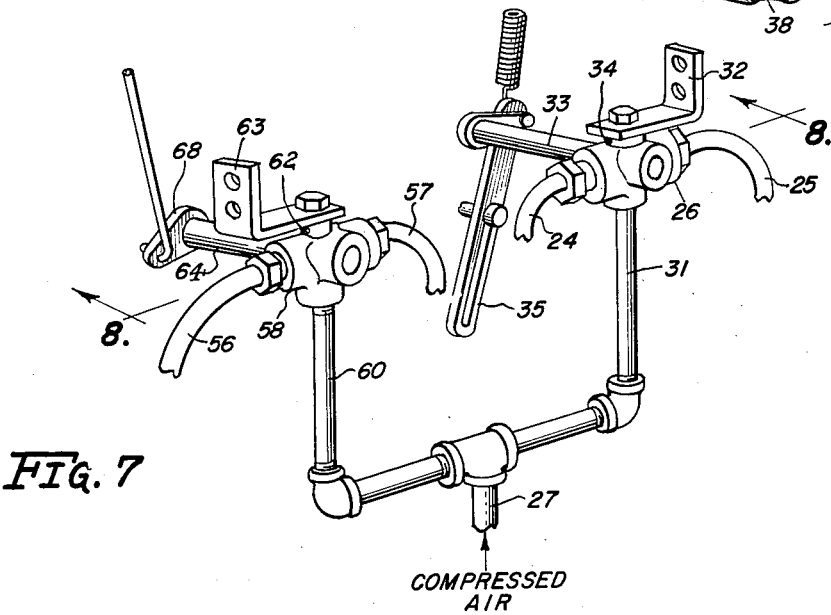
FIG. 7 is a perspective view illustrating the central valves and parts of the operating levers connected therewith.

Secured on the lower face of the mounting bracket 45 is a depending vertical closed air cylinder 50 which is secured by tie bolts 51 to said bracket. Said cylinder 50 may alternatively be of the hydraulic type. Said cylinder has a passaged end plate in which is mounted a piston rod 52 on the inner end of which is mounted a piston 53, as illustrated in FIG. 2, said piston being reciprocal in said cylinder 50. The cylinder 50 has an upper air inlet fitting 54 and a lower air inlet and exhaust fitting 55. Said upper air passage fitting 54 is connected by an air hose 56 to the inlet fitting of a four-way air control valve 58, shown in cross section in FIG. 8 and in perspective in FIG. 7. The lower fitting 55 of cylinder 50 is connected by an air hose 57 to the opposite passage 59 of the valve housing 58. As shown in FIGS. 7 and 8, the lower part of the valve housing 58 is connected by a pipe 60 to a compressed air source, as shown in FIG. 7. The valve element in the form of a passaged shaft 61 is journalled for rotation in valve housing 58 and it has two separate passages transversely therethrough which are adapted to selectively communicate the respective ports or passages of valve housing 58. Numeral 62 designates an outlet port or passage in the upper portion of the valve housing 58 which is adapted to be communicated with the hose 57 in a certain position of said valve element 61, as illustrated in FIG. 8. Said valve housing 58 is suitably secured by a bolt to a right angled apertured bracket 63 which is suitably secured to the side wall 48 for example, by bolts (not shown). The valve element 61 has an integral projecting shaft portion 64 as illustrated in FIG. 7, on which is mounted a short apertured arm or lever 68, as shown in FIG. 7.

Secured on the upper wall 16 are two spaced apart lugs 69 in which are mounted two inwardly extending relatively short horizontal pins 70, as illustrated in FIGS. 1 and 3. Pivotally mounted on the opposed pins 70 of the spaced part lugs or ears 69 is a manually operable plate-like transversely extending lever 71, as shown in FIGS. 1, 3 and 5. Said plate-like lever 71 has its free edge angularly bent as indicated.

As shown in FIG. 5 an apertured ear 72 is secured by welding or the like to the underside of the plate-like lever 71, and a metal connecting link 73 has one of its angularly bent ends pivotally connected to ear 72 and its other angularly bent end pivotally connected in the aperture of the arm 68. The link 73 is of such a length that elevation of the plate-like lever 71 will cause the arm 68 to be raised upwardly and the valve element 61 would be rotated to cause the said valve element to communicate the air intake pipe 60 with the interior of the upper end of the vertical cylinder 50, to thereby cause the piston 53 to be moved downwardly. The operation effected thereby will be subsequently described.

Secured by a pair of opposed nuts on the lower threaded end of the piston rod 52 is a cross bar 80 whose opposite ends are reduced and on which said opposite ends are pivotally mounted the lower ends of levers 81 and 82, as shown in FIG. 4. Said levers 81 and 82 have their upper ends L-shaped and angular as illustrated in FIGS. 3 and 5 to form a substantial hook or yoke. Mounted on the upper end portions of the levers 81 and 82 by rivets or pins 83b are two recessed and apertured brackets 83a respectively said rivets 83b extending through holes in said levers 81 and 82. An elongated horizontally extending U-shaped saddle or bracket 83 is secured by welding to the two brackets 83a, as illustrated in cross section in FIGS. 3 and 5.

Number 85 designates a pressure member or pressure plate of metal and of arcuate cross section which has a central upwardly extending reinforcing web or rib 86 secured thereto by welding or the like. Rib 86 is removably mounted within the saddle 83, as shown in FIG. 4, so that said pressure plate may be easily removed for easy cleaning.

Secured by welding in the opposite ends of the pressure plate 85 and said web 86 are angularly bent end plates 87, as illustrated in FIGS. 1 and 4.

Said pressure plate 85 is of a length and width to snugly fit within the hopper 36 so that its lateral edges will move substantially adjacent the side walls of the hopper and so that its angular end plates 87 will move adjacent the end walls upon vertical movement of the pressure plate, as illustrated in FIG. 5. The horizontally extending portions of end plates 87 engage the end plate 40 and flange 37 upon full downward movement of the pressure plate to limit the downward movement of said pressure plates.

The top wall 16 has a pair of transversely extending slots 88 therein which are spaced apart, as illustrated in FIG. 1, and the levers 81 and 82 extend and move through said slots.

Referring to FIGS. 3 and 5, a pair of arcuate metal guide tracks 89, have their opposite ends secured by welding or the like to the lower edge portion of the bar 44 and to the under face of the top wall 16. Journalled by pins on each of the middle portions of each of the levers 81 and 82 are metal rollers 90, one of which is shown in FIG. 5, and both thereof in dotted lines in FIG. 2. Said rollers 90, are in a position so that upon air-actuated upward movement of said levers or yokes 81 and 82, said rollers 90, will rollably engage inside curved faces of the guide tracks 89 to thereby cause said levers or yokes 81 and 82, to swing and pivot to the side edge of the machine toward the side wall 47 thereof, to the upper position illustrated in FIG. 3. This upward sidewise swinging movement also carries with it the pressure plate 85 to thereby move said pressure plate transversely and to expose the upper opening of the hopper for reloading of meat or the like.

As shown in FIGS. 3 and 5, the intermediate portion of the levers 81 and 82 have secured thereon perpendicular transversely extending headed stub shafts 91 and 92. On said stub shaft 92 is journalled a flanged roller 93 and which extends through the slot of lever 35 and slidably engages said lever 35.

When the levers 81 and 82 are moved to their lowermost position as shown in FIG. 5, the stub shaft 92 and roller 93 pull the lever 35 down to open the valve element of valve 26 to admit compressed air into the rear end of cylinder 20 and to project the plunger 23 to thereby push the compressed meat from the hopper into and through nozzle 41 and into a container or casing mounted over the outlet of said nozzle.

One end of a spring 94 is anchored in a hole in flange 49 (see FIG. 3) and its opposite end is anchored to the intermediate portion of stub shaft 92 as shown in FIGS. 2 and 3. A similar second spring 95, shown at the left of FIGS. 2 and 4, is connected to stub shaft 91 and to the flange 49. As the levers 81 and 82 are moved downwardly the springs 94 and 95 pull the levers 81 and 82 side-wise and toward the center of the machine and cause the roller to ride the curved face of tracks 89. As the levers descend the pressure plate 85 will be moved in an arcuate path to properly enter the hopper between its parallel side walls.

On upward movement of levers 81 and 82, the pressure plate follows an arcuate path upwardly with the curved guide tracks 89 being engaged by the rollers 90.

I provide a spring-impelled means for quickly raising the levers 81 and 82 and the pressure plate 85 from its extreme lowered position so that the uppermost position of the pressure plate is attained more quickly to permit quicker reloading of the hopper. The accelerating elevating means comprses a helical spring 96 shown in FIGS. 3 and 5 and which has one hooked end thereof hooked on a headed pin 97 secured on the inside face of the wall 47. The lower end of spring 96 is hooked to the horizontal pin which pivotally connects lever 35 and arm 33a of valve 33, as shown in FIGS. 3 and 5.

Upon downward movement of levers 81 and 82 and lever 35 the spring 96 is stretched, and when the compressed air is released from the upper part of the lower cylinder 50 by the operation of the valve previously described, the action of spring 96 will immediately start an upward movement of the levers 81 and 82 and the pressure plate 85 and an opening of the valve 26 before the air pressure is built up in the lower part of cylinder 50. While such compressed air below piston 53 and in cylinder 50 will raise said piston 53, levers 81 and 82 and said pressure plate after a short interval when it has attained sufficient pressure, such interval and delayed upward movement is avoided by the returning action of said spring 96.

The operation is as follows. The meat or other food pieces to be packaged and pressed are placed upon the horizontal work panel 17. The machine is set with the levers 81 and 82 and the pressure plate 85 in uppermost position as illustrated in FIGS. 2 and 3. The desired quantity of meat or food pieces are placed in the hopper or mold 36, for example, to substantially fill same. Thereupon the operator will raise the plate like lever 71 to pull upward the link 73 and the crank arm 68 to rock the shaft 64 to thereby move the valve element 61 to admit compressed air from the compressed air source through the pipe to the upper port of the lower vertical cylinder 50. This causes a descent of the piston 53 and piston rod 52 and offset cross arm 80 and levers 81 and 82 to thereby cause downward and sidewise movement of the pressure plate 85 which will enter the upper opening of the hopper or mold 36. The sidewise or transverse movement of said levers 81 and 82 and said pressure plate 85 is caused by the two springs 94, and aforesaid movement of said pressure plate is in a downward and arcuate path due to the engagement of roller 90 with the arcuate track 89, as shown in FIG. 3.

As the pressure actuated movement downward continues, the pressure plate 85 will continue to compress the mass of meat or food into a substantially cylindrical form within said hopper 36 and until said pressure plate is stopped by the angularly extending end plates 87 which engage the stationary parts as illustrated in FIG. 4.

When the lever 82 reaches a predetermined point in its downward movement during which the roller 93 slides in the slot of lever 35, the said roller 93 will pull downwardly on lever 35 to rock the arm 33a and valve element 33 to open said valve to cause compressed air to enter the rear end of cylinder 20 through the tube 24. This causes the piston 21 to move horizontally and push the plunger 23 from its position in the end of the hopper or mold 36 against the compressed mass of meat or food while the pressure plate 85 is in compressing position. This results in the compressed mass of meat or food to be pushed out through the outlet opening of the hopper or mold, through the opening of the mounting plate 40 and through the nozzle 41 and into either a flexible casing which has been slipped over said nozzle or into a bag or other container in which the product is to be enclosed. The position of the parts while said valve 33 is open and during the meat ejecting step are illustrated in FIGS. 4 and 5.

When the plunger 23 has been projected its full distance and the meat mass ejected, the operator will lower the plate like lever 71 to its original downward position, to thereby operate the valve 33 to communicate the cylinder 20 with the exhaust port of said valve and simultaneously cause compressed air to be introduced through pipe 25 into the forward portion of cylinder 20 to cause retraction of piston 21 and plunger 23 to return the latter to its fully retracted position.

At the same time that the operator pushes downward the lever 71, the valve 61 is operated to admit compressed air through fitting 55 into the lower part of the vertical air cylinder 50 to cause piston 53 to be raised upwardly to in turn raise levers 81 and 82 and the pressure plate 85. The said upward movement is in an arcuate path from the position illustrated in FIG. 5 to the upper and out of the way position illustrated in FIG. 3, this due to the engagement of roller 90 with arcuate track 89. This results in the positioning of pressure plate 85 to expose for free loading the hopper opening of the said hopper or mold 36.

As soon as the plunger 23 has reached the end of its forward projecting stroke, and as soon as the valve 61 is operated to start admission of compressed air into the lower end of the vertical cylinder 50, the auxiliary spring 96 starts to pull upward the crank arm 33a, the lever 35 and the levers 81 and 82, this without waiting for the air pressure under the piston 53 to build up sufficiently to lift the levers 81 and 83 and the pressure plate into operating position. Accordingly the actions of spring 96 accelerates the upward movement of levers 81 and 82 and pressure plate 85, to thereby more quickly permit the operator to reload the said hopper.

While I have described the preferred form of my invention as having air-actuated pistons, air cylinders, and air valves, I desire it to be understood that the fluid medium to operate said cylinders may be liquid and the cylinders and control valves may be of the hydraulic type and which will equivalently operate as herein described.

As many changes could be made in the above construction, and as many apparently widely different embodiments of my invention within the scope of the claims could be constructed without departing from the spirit and scope thereof, it is intended that all matter contained in the accompanying specification shall be interpreted as illustrative and not in a limiting sense.

I claim:

1. In a machine for selectively compressing meat or the like; a table having a central opening; an upwardly opening hopper mounted in said table and having opposite end openings; a depending air cylinder; a piston and piston rod slidable in said cylinder; a pair of upwardly extending hook-bearing levers pivotally connected to said piston rod and extending above said hopper, a pressure plate connected to the upper ends of said levers and adapted to be moved into and out of said hopper; an air controlled valve having air outlets communicatively connected to the opposite ends of said cylinder; a manually operable lever pivoted adjacent said table; a link pivotally connecting said manually operable lever and said valve; a second air cylinder extending horizontally; a piston and piston rod in said second air cylinder;

a plunger on the outer end of said last mentioned piston rod and adapted to move substantially horizontally in said hopper; a second air control valve; pipes connecting the outlets of said air control valve and said second cylinder; said second air control valve being connectable to a compressed air source; a slotted lever pivotally connected to said second air control valve and to one of said hook-bearing levers; arcuate track means on said table said track means being adapted to impart transverse movement of said hook-bearing levers; and a roller journalled and connected on one of said levers and slidably engaging the slot of said slotted lever; a second roller on one of said hook-bearing levers and adapted to engage said arcuate track means the elevation of said manually operated lever being adapted to introduce air into the upper portion of said depending cylinder to move downwardly said two hook-bearing levers and said pressure plate, the downward movement of said hook-bearing levers being adapted to move said slotted lever to open said second air control valve to cause projection of said plunger to thereby push a compressed meat mass through and from said hopper.

2. In a machine for compressing meat and the like; a table; an upwardly opening hopper mounted in said table and having opposite end walls having openings therein; an air-operated mechanism below said table; means for controlling said air-operated mechanism; upwardly extending levers connected to said air-operated mechanism and extending above said hopper; a pressure plate connected to the upper ends of said levers and adapted to be moved into and out of said hopper; a second air-operated reciprocating mechanism adjacent one end wall of said hopper and including a reciprocal plunger slidable in said hopper; a control valve for said last mentioned air-operated mechanism; said first mentioned air-operated mechanism being adapted to raise and to lower said levers and said pressure plate with respect to said hopper; said plunger, when projected, being adapted to press a compressed meat mass from said hopper, means for guiding said levers in an arcuate path during upward and downward movements thereof to position said pressure plate to expose said hopper for reloading; and a slotted link connected to one of said levers and to the control valve of said second mentioned mechanism to cause said plunger to be moved through said hopper upon full descent of said pressure plate.

3. In a machine for compressing meat and the like; a table; an upwardly opening hopper mounted in said table and having opposite end walls and openings therein; an air-operated mechanism below said table, means for controlling said air-operated mechanism including a manually operable lever; upwardly extending levers connected to said air-operated mechanism and extending above said hopper; a pressure plate connected to the upper ends of said upwardly extending levers and adapted to be moved into and out of said hopper; a second air-operated reciprocating mechanism adjacent one end wall of said hopper and including a plunger slidable in said hopper; a control valve for said last mentioned air-operated mechanism; said first mentioned air-operated mechanism being adapted to raise and to lower said upwardly extending levers and said pressure plate into and out of said hopper; said plunger, when projected, being adapted to press a compressed meat mass from said hopper, a slotted lever operatively connecting one of said upwardly extending levers and said valve of said second air-operated mechanism whereby said second air operated mechanism will be actuated, upon descent of said upwardly extending levers, to cause projection of said plunger; and spring means connected to said upwardly extending levers to move same transversely to position said pressure plate to expose the said hopper.

4. In a machine for selectively compressing meat or the like; a table; an upwardly opening hopper in said table and having opposite end openings; a lower air cylinder connected to said table; a piston and piston rod slidable in said cylinder; a pair of upwardly extending levers pivotally connected to said piston rod and extending above said hopper; a compression plate removably connected to the upper portion of said levers and adapted to be moved into and out of said hopper; manually operated valve means connected to the ends of said cylinder; a second air cylinder connected to said table and extending substantially horizontally; a piston and piston rod in said second air cylinder; a plunger on the outer end of said last mentioned piston rod and adapted to reciprocate longitudinally in said hopper; valve means for controlling compressed air to said second air cylinder; a link pivotally connecting one of said levers and said last mentioned valve means whereby said valve means of said second cylinder will be operated upon full descent of said levers to cause projection of said plunger through said hopper; an arcuate guide track mounted on said table adjacent one of said levers; and spring means for holding said levers in engagement with said arcuate track and for upward and downward movement in an arcuate path to position said pressure plate adjacent one side of said hopper in its upper position and to move said pressure plate to enter the hopper opening of said hopper upon downward movement of said levers.

5. In a machine for selectively compressing meat or the like; a table; an upwardly opening hopper in said table and having opposite end openings; a lower air cylinder connected to said table; a piston and piston rod slidable in said cylinder; a pair of upwardly extending levers pivotally connected to said piston rod and extending above said hopper; a compression plate removably connected to the upper portion of said levers and adapted to be moved into and out of said hopper; manually operated valve means connected to the ends of said cylinder; a second air cylinder connected to said table and extending substantially horizontally; a piston and piston rod in said second air cylinder; a plunger on the outer end of said last mentioned piston rod and adapted to reciprocate in said hopper; valve means for controlling compressed air to the ends of said second air cylinder; a link pivotally connecting one of said levers and said last mentioned valve means whereby said valve means of said second cylinder will be operated upon full descent of said levers to cause projection of said plunger through said hopper; an arcuate guide track mounted on said table adjacent one of said levers; and spring means for holding said levers during upward and downward movement in engagement with said guide track in an arcuate path to position said pressure plate to enter the hopper opening of said hopper upon downward movement of said levers, and a spring connecting said link and said table and adapted to open said valve means of said lower air cylinder to cause elevation of said compression plate.

6. In a machine for selectively compressing meat or the like; a table; an upwardly opening hopper in said table and having end openings; a lower air cylinder connected to said table; a piston and piston rod slidable in said cylinder; a lever pivotally connected to said piston rod and extending above said hopper; a compression plate connected to the upper portion of said lever and adapted to be moved into and out of said hopper; manually operated valve means connected to said cylinder; an air operated mechanism connected to said table and extending substantially horizontally; a plunger slidable in said hopper and operably connected to said last mentioned air operated mechanism; valve means for controlling the air to the ends of said air operated mechanism; a link pivotally connecting said lever and said last mentioned valve means whereby said valve means of said air operated mechanism will be operated upon descent of said lever and to cause projection of said plunger through said hopper; an arcuate guide track mounted on said table adjacent said lever and adapted to guide said first mentioned lever; and spring means for holding said lever during upward and downward movement in an arcuate path to position said pressure plate adjacent one side of said hopper and to move said pressure plate to enter the hopper opening of said hopper upon downward movement of said levers.

7. In a machine for compressing meat or the like; an elongated supporting table; an elongated upwardly opening passaged hopper removably mounted in said slot of said table, said hopper having openings at both ends thereof; a downwardly extending cylinder mounted on the bottom of said table; said cylinder being adapted to receive a flowable medium; a piston and piston rod in said cylinder; a pair of elongated hook-like levers connected at their lower ends to said piston rod and having their hook-like upper portions extending above said table; an arcuate pressure plate removably connected to the hook-like ends of said levers and adapted to be moved into and out of said hopper; an arcuate track mounted on said table; a roller mounted on the intermediate portion of said levers and adapted to roll along said track, said rolling engagement of said roller with said track being adapted to move the upper portions of said levers and said pressure plate both upwardly and transversely to expose the upper portion of said hopper to facilitate re-loading thereof; a four-way valve connected to a flowable medium source and to the opposite ends of said cylinder; a plate-like lever pivoted on said table; a link connecting said plate-like lever and said valve, the upward movement of said plate-like lever being adapted to introduce a flowable medium into said cylinder to move said hook-like levers and said pressure plate downwardly and to move said hook-like levers and said pressure plate transversely and upwardly; a second horizontal cylinder; a piston and piston rod slidable in said second cylinder; a plunger on the outer end of said piston rod horizontally movable in said hopper; a second control valve; pipes connecting said second air control valve and said horizontal cylinder and a flowable medium source; a lever slidably mounted on one of said first mentioned levers and connected to said second valve; and a spring connecting said table and one of said first mentioned levers for moving said hook-like levers transversely to position said pressure plate in said hopper; the downward movement of said last mentioned slidably mounted lever being adapted to operate said last mentioned valve to cause projection of said plunger into said hopper.

8. In a machine for compressing meat or the like; an elongated supporting table having an elongated central opening; an elongated upwardly opening passaged hopper removably mounted in said opening of said table and having end walls, said hopper having end walls having openings therein; a downwardly extending air cylinder mounted on the bottom of said table; a piston and piston rod in said air cylinder; a pair of elongated hook-like levers connected at their lower ends to said piston rod and having their hook-like upper portions extending above said table; an arcuate pressure plate removably connected to the hook-like ends of said levers and adapted to be moved into and out of said hopper; an arcuate track mounted on said table; a roller mounted on the intermediate portion of said levers and adapted to roll along said track, said rollable engaging of said roller with said track being adapted to guide the upper portions of said levers and said pressure plate both upwardly and transversely to expose the upper portion of said hopper to facilitate re-loading thereof; a four-way valve connected to a compressed air source and to the opposite ends of said air cylinder; a platelike lever pivoted on said table; said plate-like lever being operably connected to said valve, the upward movement of said plate-like lever being adapted to introduce air into said cylinder to move said hook-like levers and said pressure plate downwardly and to move said hook-like levers and said pressure plate transversely and upwardly; air-actuated mechanism for discharging the compressed meat from said hopper and including a second air-operated piston and cylinder and an air control valve connected to said last mentioned cylinder and to a compressed air source; a slotted link slidably mounted on one of said first mentioned hook-like levers and connected at one end thereof to said second air control valve, and a spring connecting said table and the intermediate portion of one of said first mentioned hook-like levers for swinging said levers transversely upon downward movement thereof to position said pressure plate in said hopper on such downward movement; the downward movement of said slotted link being adapted to operate said second air control valve to cause projection of said plunger into and through said hopper to discharge the compressed mass.

References Cited in the file of this patent
UNITED STATES PATENTS

| | | |
|---|---|---|
| 868,738 | Webb | Oct. 22, 1907 |
| 2,244,540 | Lenzke | June 3, 1941 |
| 2,280,849 | Pocock | Apr. 28, 1942 |
| 2,580,833 | Piper et al. | Jan. 1, 1952 |
| 2,847,808 | Romine | Aug. 19, 1958 |
| 2,932,246 | Galas | Apr. 12, 1960 |